United States Patent [19]

Kanazawa

[11] Patent Number: 4,834,229

[45] Date of Patent: May 30, 1989

[54] FLUID OPERATED MULTIPLE-DISK FRICTION CLUTCH

[75] Inventor: Kazuo Kanazawa, Tokyo, Japan

[73] Assignee: Fuji Jukogyo Kabushiki Kaisha, Tokyo, Japan

[21] Appl. No.: 230,323

[22] Filed: Aug. 9, 1988

[30] Foreign Application Priority Data

Aug. 29, 1987 [JP] Japan .................... 62-217080

[51] Int. Cl.⁴ .................... F16D 25/063; F16D 25/12
[52] U.S. Cl. .................... 192/85 AA; 192/93 A; 192/103 F; 192/106 F
[58] Field of Search .............. 192/85 AA, 85 A, 101, 192/104 F, 106 F, 109 F; 142/70.23, 103 F, 104 R, 93 A

[56] References Cited

U.S. PATENT DOCUMENTS

| | | | |
|---|---|---|---|
| 1,938,914 | 12/1933 | Kress | 192/106 F |
| 2,244,169 | 6/1941 | Miller | 192/70.23 |
| 3,819,020 | 6/1974 | Smith | 192/85 AA X |
| 3,823,802 | 7/1974 | Winzeler et al. | 192/106 F X |
| 3,851,532 | 12/1974 | Pflüger et al. | 192/104 R X |
| 4,556,817 | 11/1985 | Euler | 192/70.23 |

FOREIGN PATENT DOCUMENTS 55-57728  4/1980  Japan .

*Primary Examiner*—Rodney H. Bonck
*Assistant Examiner*—Nicholas S. Whitelaw
*Attorney, Agent, or Firm*—Martin A. Farber

[57] ABSTRACT

A fluid operated multiple-disk friction clutch has a drive drum, a driven drum co-axial with the drive drum, a hydraulic piston provided in an oil chamber. The piston is moved by oil pressure to engage disks so as to engage the clutch. A pair of annular cam plates are provided to form an annular space adjacent the piston. One of the annular cam plates has a tapered surface. A plurality of fall weights are provided in the space. The tapered surface acts to provide an axial component from centrifugal force in the weights, so as to push the piston in the clutch disengagement direction.

3 Claims, 3 Drawing Sheets

FLUID OPERATED MULTIPLE-DISK FRICTION CLUTCH

BACKGROUND OF THE INVENTION

The present invention relates to a clutch for a power transmission system for a motor vehicle, and more particularly to a clutch in the form of a fluid operated multiple-disk friction clutch. This type of clutch is employed, for example in a transfer device for a four-wheel drive vehicle, for controlling the torque capacity in accordance with driving conditions of the vehicle.

As shown in FIG. 4, a conventional fluid operated multiple-disk friction clutch 100 comprises a drive drum 101 having a hub 104' secured to a drive shaft 104, a driven drum 113 secured to a gear 114. An oil chamber 103 is formed between drum 101 and a piston 102. When oil is supplied to the chamber 103 through passages 105 and 105' formed in the shaft 104 and hub 104', the piston 102 is urged by the oil pressure to push disks 107 secured to the piston to disks 108 secured to the hub 113 against the elastic force of a spring 106. Thus, the disks 107 and 108 are engaged to transmit the torque of the shaft 104 to the gear 114. When the oil is drained from the chamber 103, the piston 102 is returned to the position of FIG. 4 by the spring 106, so that the disks 107 and 108 are disengaged.

In high speed operation of the clutch, the centrifugal force in the oil in the oil chamber 103 is exerted on the piston 102. In order to avoid the influence of the force, a drain passage 109 having a check ball 110 is formed in the piston 102. When the rotational speed exceeds a predetermined speed, the check ball 110 moves away from a port 111 of the drain passage 109 by the centrifugal force as shown in FIG. 5, so that the oil is drained from the port 111 for cancelling the centrifugal oil pressure.

If the conventional clutch is used for a transfer clutch of an automatic transmission, the transfer clutch is provided for controlling the torque capacity by continuously varying the actuating pressure. In such a system, it is difficult to control continuously from a low speed to a high speed, because the oil is drained in a high speed range. In addition, when the speed increases more than the predetermined speed, there is no oil in a space between the drain port 111 and the chamber 103. Accordingly, timing of the clutch engagement at a low speed is different with that of a high speed operation. Further, it is possible to produce a negative pressure in the space.

Japanese patent application laid-open No. 55-57728 discloses a clutch in which another oil chamber is provided on opposite side of a piston corresponding to an actuating oil chamber for cancelling the centrifugal oil pressure. However, in such a structure, a necessary hydraulic control structure besides the oil chamber must be provided, which renders the clutch complicated in construction.

SUMMARY OF THE INVENTION

The object of the present invention is to provide a fluid operated multiple-disk friction clutch which may mechanically eliminate the influence of the centrifugal oil pressure with a simple structure.

According to the present invention, there is provided a fluid operated multiple-disk friction clutch having a drive drum, a driven drum co-axial with the drive drum, a plurality of disks provided on both drums to be engaged with each other, a hydraulic piston provided in an oil chamber formed in one of the drums, an oil passage for supplying oil to the oil chamber to move the piston to push one of the disks so as to engage the clutch. The clutch comprises an annular member forming an annular space adjacent the piston, a plurality of weights provided in the space, and means provided in the space for producing an axial component from centrifugal force in the weights, so as to push the piston in the clutch disengagement direction.

In an aspect of the invention, the annular member is constructed by a pair of annular cam plates, and the means is a tapered inner surface formed on one of the cam plates.

The other objects and features of this invention will become understood from the following description with reference to the accompanying drawings.

DETAILED DESCRIPTION OF THE PREFERRED EMBODIMENT

Figure 1:
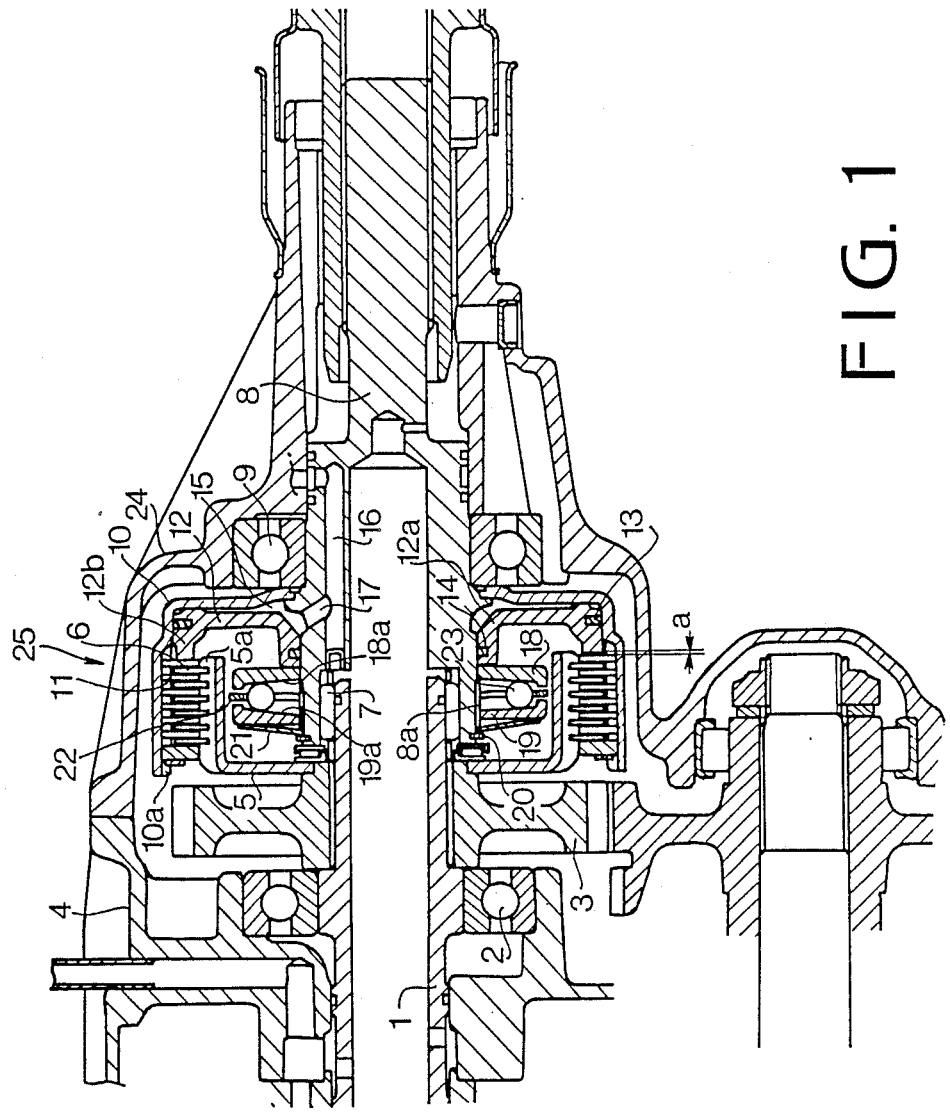
FIG. 1 is a sectional view showing a clutch of a transmission for a motor vehicle according to the present invention.

Referring to FIG. 1 showing a clutch used for a transfer clutch for an automatic transmission for a four-wheel drive vehicle according to the present invention, an input shaft 1 is rotatably supported in a transmission case 4 through a bearing 2 for transmitting the power of an engine from the transmission to a transfer device through a reduction drive gear 3 which is securely mounted on the input shaft 1. The input shaft 1 is rearwardly extended to a transfer case 24, in which a rear drive shaft 8 is rotatably supported through a bearing 9. An end of the rear drive shaft 8 is rotatably mounted on the input shaft 1 through a needle bearing 7. The rear drive shaft 8 is operatively connected to a final reduction device (not shown) for rear wheels.

A transfer clutch 25 in the form of a fluid operated multiple-disk friction clutch is provided in the transfer case 24. The transfer clutch 25 comprises a drive drum 5 secured to the reduction drive gear 3 as a drive member, a driven drum 10 secured to the rear drive shaft 8 as a driven member, a plurality of disks 6 splined on the drum 5 through splines 5a, and a plurality of disks 11 splined on the drum 10 through splines 10a, alternately arranged. A piston 12 is provided in the drum 10 and slidably mounted on the shaft 8. The piston 12 has an oil seal 14 at a boss 12a and engaged with an inner periphery of the drum 10 at an outer flange 12b having an oil seal 13. An end of the outer flange 12b is adapted to engage with the innermost disk 11. An oil chamber 15 is formed between the piston 12 and the drum 10. Oil is supplied to or drained from the chamber 15 through a port 17 and an oil passage 16 formed in the shaft 8.

Figure 3:
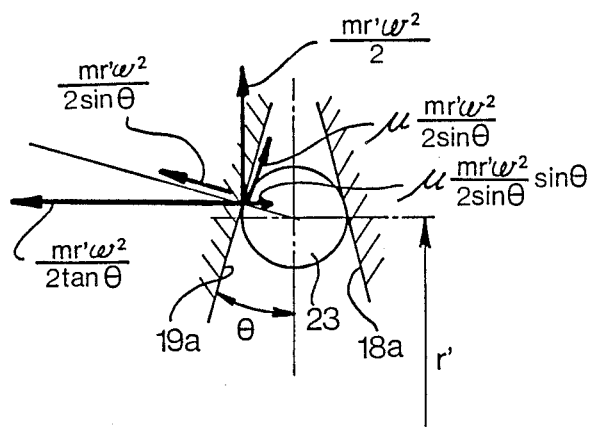
FIG. 3 is an illustration showing vectors between a weight and cam plates in the clutch produced by the centrifugal force.
Figure 4:
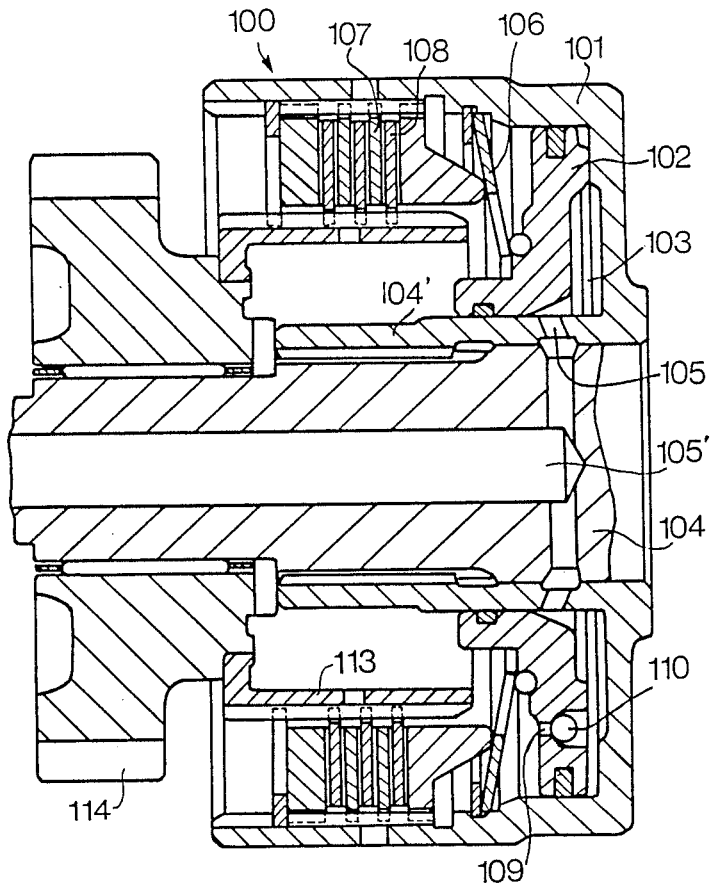
FIG. 4 is a sectional view showing a conventional clutch of a transmission for a motor vehicle.
Figure 5:
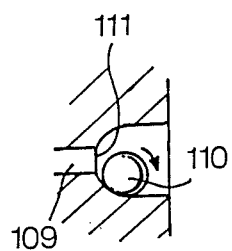
FIG. 5 is an enlarged view showing a part of FIG. 4.

In the present invention, a pair of cam plates 18 and 19 are disposed in the drum 10 and mounted on the shaft 8. Tapered inner surfaces 18a and 19a, each having an angle θ (FIG. 3), are formed on opposite walls of cam plates 18 and 19, respectively. The tapered surfaces 18a and 19a are disposed to form an annular space the width of which is gradually reduced to the periphery thereof. The cam plate 18 is mounted on the shaft 8 so as to abut on an end of the boss 12a of the piston 12 in the axial direction of the shaft 8. The cam plate 19 is splined on splines 8a of the shaft 8. Adjacent the cam plate 19, a disk spring 21 is secured to the shaft 8, supported by a snap ring 20 fixed to the shaft 8. Thus, the cam plate 19 is yieldably urged to the cam plate 18 in the axial direction of the shaft 8.

Figure 2:
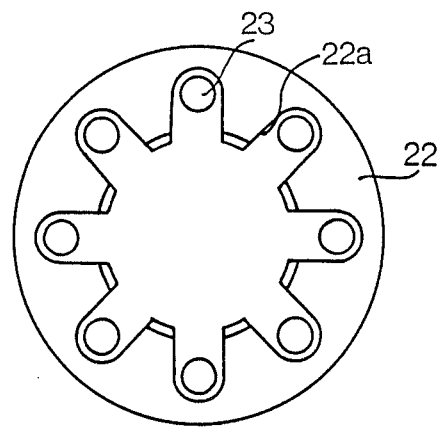
FIG. 2 is a plan view of a retainer in the clutch of the present invention.

An annular retainer 22 is disposed in the annular space between cam plates 18 and 19 and splined on the splines 8a. As shown in FIG. 2, the disk retainer 22 has a plurality of notches 22a radially extending from the inside space. A ball-shaped weight 23 is movably engaged with each of the notches 22a. Thus, the weight 23 is movable in the radial direction of the retainer 22 in the space between taper surfaces 18a and 19a of cam plates.

When oil is supplied to the chamber 15, the piston 12 is pushed by the pressure of the oil. The outer flange 12b of the piston pushes the disks 6 and 11 to engage the transfer clutch 25. Thus, the power of the engine from the input shaft 1 is transmitted to the rear drive shaft 8 through the reduction drive gear 3, drum 5, disks 6, 11, and drum 10. When the oil is drained from the chamber 15, the piston 12 is moved toward the chamber 15 by the force of the spring 21 so that the frange 12b is released from the disk 6 (for example, having a clearance a as shown in FIG. 1) to disengage the disks 6 and 11. Thus, the clutch 25 is disengaged.

If the clutch 25 is disengaged at a high speed rotation, the shaft 8 continues to rotate at the high speed. The centrifugal oil pressure is applied to the chamber 15, so that the piston 12 is subjected to a force F in the axial direction of the shaft 8. At that time, the centrifugal force causes the weights 23 in the notches 22a of the retainer 22 to outwardly move to thrust the cam plates 18 and 19 in the axial direction. Thus, the cam plate 18 is pushed by the weight 23 to produce a force F′ in the reverse direction of the force F, which is applied to the piston 12 through the boss 12a.

Accordingly, if components of the clutch are properly designed and a relationship that the force |F| is equal to the force |F′| is obtained, the centrifugal force is canceled by the function of the weights 23.

The force F exerted on the piston by the centrifugal force in the oil chamber is expressed as $$F = \int_{r1}^{r2} 2\pi r p \, dr = K n^2 \quad (1)$$

where
r1 is the inner radius of the piston,
r2 is the outer radius of the piston,
P=f(r) is the centrifugal oil pressure (function of the radius r),
r is an arbitrary radius,
n is the rotational speed (r.p.m.), and K is a constant determined by r1, r2, and specific gravity of the oil.

While, the thrust force F′ dependent on the weights is represented as $$F' = \{(1/\tan \theta) - \mu\} m \cdot n' \cdot r' \cdot (2\pi/60)^2 n^2 = K' n^2 \quad (2)$$

where
θ is the angle of the tapered inner surface of the cam plate,
μ is the coefficient of the friction,
m is the mass of the weight,
n′ is the number of the weight,
r′ is a design radius, and
K′ is a constant determined by θ, μ, m, n′, and r′

In the above mentioned equations (1) and (2), when $K = K'$, the influence of the centrifugal oil pressure is canceled. The equation (2) is derived from vectors shown in FIG. 3 and an equation $\omega = (2\pi/60)n$. Thus, the clearance a is maintained even if the transfer clutch is disengaged at a high speed, thereby preventing a control error.

In the present embodiment, a pair of cam plates 18 and 19 are employed as a pushing element for pushing the piston 12. In place of cam plates, a taper portion is formed in the piston 12 for actuating the piston as a part of or a pushing element. Further, in place of the ball-shaped weight, a mechanical weight such as a governor weight can be used.

From the foregoing, it will be understood that the present invention provides a fluid operated multiple-disk friction clutch in which the influence of the centrifugal oil pressure on the piston in the clutch can be eliminated in accordance with a simple mechanical structure, thereby providing an optimum clutch control of the automatic transmission.

While the presently preferred embodiment of the present invention has been shown and described, it is to be understood that this disclosure is for the purpose of illustration and that various changes and modifications may be made without departing from scope of the invention as set forth in the appended claims.

What is claimed is:

1. A fluid operated multiple-disk friction clutch having a drive drum, a driven drum co-axial with the drive drum, a plurality of disks provided on both drums to be engaged with each other, a hydraulic piston provided in an oil chamber formed in one of the drums, an oil passage for supplying oil to the oil chamber to move the piston to push one of the disks so as to engage the clutch, the clutch comprising:
   an annular member forming an annular space adjacent the piston;
   a plurality of weights provided in the space; and
   means provided in the space for producing an axial component from centrifugal force in the weights, so as to push the piston in the clutch disengagement direction.

2. The clutch according to claim 1 wherein the annular member is constructed by a pair of annular cam plates.

3. The clutch according to claim 2 wherein the means is a tapered inner surface formed on one of the cam plates.

* * * * *